No. 707,638. Patented Aug. 26, 1902.
D. REYNOLDS.
PROCESS OF PRODUCING STEEL DIRECT FROM OXID OF IRON ORE.
(Application filed May 14, 1902.)
(No Model.)
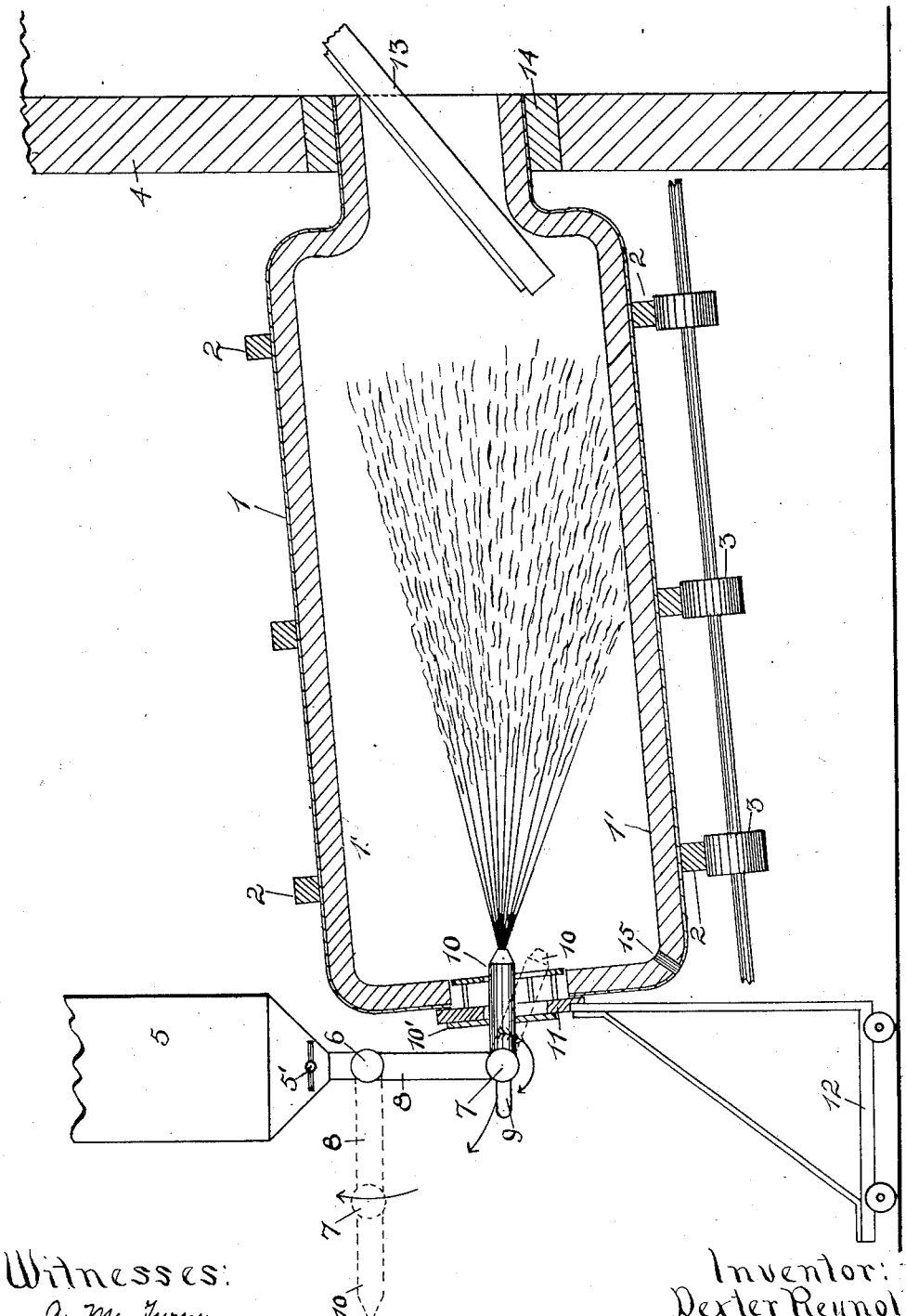
Witnesses:
a. M. Turner.
P. H. Shafer.
Inventor:
Dexter Reynolds
By W. W. Brown
his Atty.

UNITED STATES PATENT OFFICE.

DEXTER REYNOLDS, OF ALBANY, NEW YORK.

PROCESS OF PRODUCING STEEL DIRECT FROM OXID-OF-IRON ORE.

SPECIFICATION forming part of Letters Patent No. 707,638, dated August 26, 1902.

Application filed May 14, 1902. Serial No. 107,320. (No specimens.)

*To all whom it may concern:*

Be it known that I, DEXTER REYNOLDS, a citizen of the United States, residing at Albany, New York, have invented certain new and useful Improvements in Processes of Producing Iron and Steel Direct from Ore; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a new and economical process for producing steel direct from oxid-of-iron ore, and is an improvement on my former process shown and described in my Patent No. 686,130, dated November 5, 1901, and entitled "Process of producing steel direct from ore."

My present process differs materially from that shown and described in the patent above referred to principally in the first step claimed in that patent.

I have ascertained that a very material loss in steel and iron production arises from the mixing of the ore, carbonaceous material, and fluxes in the first instance and subjecting them when thus mixed to the action of the heat of the furnace. The flux, such as lime, is fused at a comparatively low temperature, but slightly above that required to deoxidize the ore and carbonize the metal in it, and is liable to be fused before all the particles of the ore have been deoxidized and the iron carbonized, its fusion causing some of the particles of the oxid of iron to be coated or surrounded by the fused flux, thus preventing their being acted upon by the carbon, as the deoxidation and carbonization take place only at the point of contact with the carbon. These particles so coated or surrounded by the fused fluxes do not become deoxidized or carbonized, but remain simply oxid of iron, which being *per se* infusible never fuse, but are drawn off with the slag and are wasted. This loss practically amounts to ten per cent. and over of the finished product. This great loss I eliminate by my process herein described.

I make use of oxid of iron, carbonaceous material, such as coke, and fluxes in my process, all duly brought to a granulated state in order to increase the points of contact of the material.

My first step in this my present process consists of mixing the granulated oxid of iron with sufficient granulated carbonaceous material to deoxidize the iron in the ore and then duly carbonize it, this mixing taking place inside or outside of a suitable furnace, as may be desired. The mixture is then suitably distributed in the furnace. I preferably distribute this mixture in the furnace so it will lie in a comparatively thin mass and well spread, so that the neutral flame used to heat it may have action at once over as large a surface as possible. Having thus introduced the mixture into the furnace, my second step in my process consists of subjecting this mixture to a neutral flame sufficient to raise the temperature to a degree where deoxidation and carbonization will take place, slowly revolving the furnace so as to thoroughly stir the mixture or, if a stationary furnace be used, I stir the mixture in any well-known manner. The neutral flame is continued until all the iron in the ore is deoxidized and carbonized. By so practicing my process up to this point every particle of iron in the ore comes in contact with a particle of carbonaceous material, there being no flux to become fused and incase or coat the particles of iron and prevent them from becoming deoxidized and carbonized. When the second step of my process is finished, I take the third step, which consists of introducing into the furnace granulated fluxes suitable in character and amount to remove impurities, and these fluxes are suitably mixed with the deoxidized and carbonized material already therein. While this third step is being practiced, the fluxes will fuse and some of the iron in the ore become coated by the fused fluxes; but as these particles have all been duly deoxidized and carbonized before the fluxes were introduced in the furnace they will fuse and part from the fused fluxes as soon as the temperature of the furnace is raised sufficiently to melt the iron in the ore. My fourth step is to increase the temperature of the furnace to the melting-point of the deoxidized and carbonized iron by increasing the intensity of the flame by changing it to a true blowpipe-flame, carefully maintaining its neutral character, however, and with this blowpipe-flame I attack the surface of the mixture by directing it down and upon it until fusion of the metal takes place. My fifth step is the removal of the slag, all done in one and the same closed furnace. By thus carrying out this my improved process I lose little, if any, of the iron in the ore and make a saving of the ten per cent. lost by all iron or steel producing plants with which I am familiar, which mix fluxes with the ore and carbon and heat the three at one and the same time, and in this respect my present improved process differs from that shown and described in my patent hereinbefore mentioned and is a very great improvement over that process. The amount of this saving and the importance of my improvement may be realized from the fact that the amount of finished product (steel ingots) lost by such plants from this cause alone amounted in the United States during the last year to several millions of tons.

In my former patent hereinbefore mentioned I have set forth the well-known chemical principles upon which that process proceeds. As the same principles are involved and the same action takes place in this my improved process, I think it unnecessary to again set them forth in this specification.

In the drawing I show one form of furnace which may be used in carrying out my process herein described.

The numeral 1 shows the metallic shell of the furnace, and 2 metal rings surrounding it resting on and rendered revoluble by the revoluble wheels 3, set upon a shaft that is suitably supported and operated by any desired source of power. As this method of revolving such furnaces is well known in the art, I have omitted to show the journal or shaft bearings.

4 shows a portion of the escape-flue, having a metallic ring 14 set in an opening therein, arranged to receive the reduced end of the furnace and allow it to revolve therein.

13 shows a removable metallic chute entering the rear end of the furnace by an opening in the rear wall of the chimney or stack, (not shown,) its outer end terminating in proximity to bins holding granulated iron ore, granulated carbonaceous material, and granulated fluxes, in order that at all times when these substances are to be shot into the furnace the chute may be put in connection with the proper bins with the least possible manual labor and the least possible loss of time. When the chute is not in actual use, it is removed and the opening in the rear wall of the chimney closed.

15 shows the tap-hole of the furnace by which the molten steel is drawn off.

5 shows a bin having the sides of its discharge ends sloping, arranged to hold a supply of powdered coal for use with the burner and having a discharge-regulating slide 5' to regulate the discharge of the powdered coal to pipe 8, which pipe has a swing joint at 6 and a similar one at 7, where it connects with the burner 10, thus allowing of swinging the burner 10 so as to point it at any spot in the furnace and also allowing of its being swung clear of the furnace altogether, as shown by the dotted lines.

At 12 is seen a carriage carrying a reinforced door 11 for closing and unclosing the mouth of the furnace, making a closed furnace 10', showing a plate or shield slidingly hung upon the burner 10 to close the opening in the door 11, through which the burner passes, the plate or shield 10' being so adjusted to the burner as to leave a slight opening through which the interior of the furnace may be viewed.

9 shows the forced-air pipe, which supplies air under pressure to the burner 10 and which is movable with it by means of jointed piping so arranged as to give flexibility to the air-pipe, the joints thereof not being seen in the drawing.

In operating the furnace shown an initial fire is first started therein by burning a quantity of gas by means of a removable gas-pipe, preferably, and when the temperature is sufficiently raised in the furnace the powdered-coal burner is turned on, blowing powdered coal in a stream into it, which immediately ignites and continues to burn. When once heated and used practically continuously, this first starting of the burner will be the only time the preliminary starting fire will be required, as the temperature of the furnace will be sufficient to start the burner. Granulated iron ore mixed with a sufficient quantity of carbonaceous material is now introduced by the chute 13, when the furnace is slowly revolved, which stirs the mixture constantly and rolls it over and over and in its travel the iron is deoxidized and carbonized. Suitable fluxes are now introduced by the chute 13, which soon become mixed with the deoxidized and carbonized material. Up to this point the flame from the burner has been maintained practically in the form of a reverberatory flame—i. e., in a spread-out and somewhat-thick flame, as is seen in the ordinary reverberatory furnace—and is so continued until the fluxes are more or less fused, when the flame, by admitting more powdered coal and a stronger air-blast to the burner, is changed to a true blowpipe-flame, care being exercised to still keep it a neutral flame, and is then turned down and upon the contents of the furnace and directed in the necessary directions to make forcible impact with the said contents, after the manner of a true blowpipe-flame, when the contents are speedily fused and then drawn off at the tap-hole. The slag may be removed before or after the pouring off, as may be desired. The furnace is again immediately charged, when the process is again repeated.

Having described my process, what I claim, and desire to secure by Letters Patent, is—

1. The process of treating oxid-of-iron ores to produce therefrom wrought iron or steel, which consists, first; in mixing granulated ore with sufficient granulated carbonaceous material to deoxidize the ore and then duly carbonize the iron in it and introducing and distributing this mixture in a suitable closed furnace; second, subjecting this mixture in said closed furnace to the surface action of a neutral heating-flame until the oxid of iron is deoxidized and the iron duly carbonized; third, introducing and distributing into said furnace granulated fluxes suitable in character and amount to remove impurities; fourth, subjecting the resultant mass to the forcible direct impact of a blast-flame directed down and upon the same until the metal is fused, and fifth, separating the slag therefrom, all in one and the same furnace substantially as described.

2. The process of treating oxid-of-iron ores to produce therefrom wrought iron and steel, which consists, first; in mixing granulated ore with sufficient granulated carbonaceous material to deoxidize the ore and then duly carbonize the iron in it and introducing and distributing this mixture in a suitable furnace; second, subjecting this mixture in said furnace to the surface action of a neutral heating-flame until the oxid of iron is deoxidized and the iron duly carbonized; third, introducing and distributing into said furnace granulated fluxes suitable in character and amount to remove impurities; fourth, subjecting the resultant mass to the action of a neutral heating-flame until the metal is fused and fifth, separating the slag therefrom, all in one and the same furnace for the purposes described.

In testimony whereof I affix my signature in presence of two witnesses.

DEXTER REYNOLDS.

Witnesses:
W. M. BROWN,
A. M. TURNER.